United States Patent
Heinrich et al.

(10) Patent No.: US 12,172,590 B2
(45) Date of Patent: Dec. 24, 2024

(54) VEHICLE POWER DISTRIBUTION CIRCUIT AND VEHICLE POWER SYSTEM

(71) Applicant: APTIV TECHNOLOGIES LIMITED, St. Michael (BB)

(72) Inventors: Markus Heinrich, Wiehl (DE); Guillaume Tournabien, Saint Soupplets (FR)

(73) Assignee: APTIV TECHNOLOGIES AG, Schaffhausen (CH)

( * ) Notice: Subject to any disclaimer, the term of this patent is extended or adjusted under 35 U.S.C. 154(b) by 0 days.

(21) Appl. No.: 17/971,953

(22) Filed: Oct. 24, 2022

(65) Prior Publication Data

US 2023/0129971 A1 Apr. 27, 2023

(30) Foreign Application Priority Data

Oct. 25, 2021 (EP) .................................... 21204579

(51) Int. Cl.
*B60R 16/03* (2006.01)
*B60L 53/60* (2019.01)
*H02J 7/00* (2006.01)

(52) U.S. Cl.
CPC .............. *B60R 16/03* (2013.01); *B60L 53/60* (2019.02); *H02J 7/0034* (2013.01); *B60L 2210/10* (2013.01)

(58) Field of Classification Search
CPC ...... B60R 16/03; B60L 53/60; B60L 2210/10; B60L 3/04; H02J 7/0034
See application file for complete search history.

(56) References Cited

U.S. PATENT DOCUMENTS

| 7,660,090 B1 | 2/2010 | Daugherty |
| 9,484,799 B2 | 11/2016 | Zhang et al. |

(Continued)

FOREIGN PATENT DOCUMENTS

| CN | 212572066 U | 2/2021 |
| DE | 102014203030 A1 | 8/2015 |

(Continued)

OTHER PUBLICATIONS

Extended European Search Report issued by the European Patent Office in connection with European Patent Application No. 21204579.3, dated Apr. 25, 2022.

(Continued)

*Primary Examiner* — Daniel Kessie
*Assistant Examiner* — Terrence R Willoughby
(74) *Attorney, Agent, or Firm* — Miller Johnson

(57) ABSTRACT

A vehicle power distribution circuit for connecting between an energy store and a power line connected to a generator or DC/DC-Converter. The circuit has a charging line connecting between the energy store and the power line for charging the energy store when a forward voltage is applied by the generator or DC/DC-Converter. A protection switch is provided in the charging line and is openable for preventing conduction of current through the protection switch in response to a drop in voltage on the power line. An ideal diode arrangement is provided in parallel to the protection switch in the charging line for conducting the forward current from the generator or DC/DC-Converter to the energy store. The ideal diode arrangement prevents the conducting of a reverse current when a reverse voltage is applied.

18 Claims, 1 Drawing Sheet

(56) References Cited

U.S. PATENT DOCUMENTS

| | | | | |
|---|---|---|---|---|
| 2009/0015977 | A1* | 1/2009 | Patel | G06F 1/30 |
| | | | | 361/92 |
| 2011/0317321 | A1* | 12/2011 | Vogel | H02H 3/025 |
| | | | | 361/87 |
| 2015/0353035 | A1* | 12/2015 | Ferrel | B60L 1/00 |
| | | | | 307/9.1 |
| 2016/0049813 | A1* | 2/2016 | Takizawa | H02J 7/0019 |
| | | | | 320/112 |
| 2017/0214258 | A1* | 7/2017 | Namou | H02J 7/0031 |
| 2018/0335007 | A1 | 11/2018 | Shields et al. | |
| 2023/0055357 | A1* | 2/2023 | Mueller | H01M 10/482 |

FOREIGN PATENT DOCUMENTS

| | | | |
|---|---|---|---|
| EP | 0987146 | A2 | 3/2000 |
| EP | 2953227 | A1 | 12/2015 |
| WO | 9609676 | A1 | 3/1996 |
| WO | WO-2022208649 | A1 * | 10/2022 |

OTHER PUBLICATIONS

TI Designs: TIDA-01167, "Automotive 12- and 24-V Battery Input Protection Reference Design", Texas Instruments, pp. 1-37, Nov. 2016.

* cited by examiner

VEHICLE POWER DISTRIBUTION CIRCUIT AND VEHICLE POWER SYSTEM

CROSS-REFERENCE TO RELATED APPLICATION

This application claims the benefit of European patent application serial number EP 21204579.3 filed on Oct. 25, 2021. The entire contents of which are hereby incorporated by reference herein.

INTRODUCTION

The present disclosure relates to a vehicle power distribution circuit and a vehicle power system. The present disclosure is particularly relevant to vehicle power safety devices, and systems and devices for short circuit protection in vehicle power distribution architectures.

BACKGROUND

Energy distribution within automotive applications is an important consideration when designing system architectures. Given the increasing prevalence of autonomous driving and the integration of enhanced safety technologies, a standard vehicle now possesses many automotive modules which require a supply of power. Importantly, it is common to differentiate between critical and non-critical modules. Critical modules are those that are paramount to safe operation of the vehicle and would normally include steering, advanced driver-assistance system (ADAS), and braking functionality. In contrast, non-critical modules would normally include interior lighting, media, and climate control systems. Due to the importance of critical modules, it is desirable to ensure that the power architecture provides for those modules to be connected to a power line that is unaffected by disturbances that might arise from varying energy availability.

In this respect, in the event of a loss of power, some non-critical modules may be configured to be preventatively disabled in order that the remaining power supply is directed towards the critical modules for as long as possible. For this, automotive power architectures may isolate the critical modules on a first power line, whilst the non-critical modules are kept apart on a second power line. However, a charging line is required between these power lines to allow the energy store, such as a battery or supercapacitor, to be charged when the vehicle is running normally.

In view of the above, a fuse may be provided in the charging line in order to protect the energy store and the critical modules in the event of a short circuit. That is, a short circuit on the second power line may cause a relatively high reverse current to be drawn from the energy store. This would result in the voltage on the first power line dropping low, which may affect the operation of the critical modules. The provision of the fuse can prevent this by breaking the connection when the reverse current exceeds the fuse's threshold. However, a problem with this solution is that the fuse will only melt if the energy store is sufficiently charged to supply a current exceeding the rating of the fuse. This is not always the case.

To address the above, more modern arrangements replace the melting fuse with a low voltage switch or a number of smart field effect transistor (FET) switches under the control of a controller. FIG. 1 shows a schematic illustration of such a conventional arrangement within a vehicle power distribution architecture 1. In this architecture, a battery 2 provides the main power source for supplying energy to one or more critical modules 4 via a first power line 3. Simultaneously, the non-critical modules 5 are supplied via a second power line 8 connected to the vehicle's generator or DC/DC converter 9 for supplying these modules when the vehicle is running.

Furthermore, a charging line 7 is provided between the first power line 3 and the second power line 8. When the vehicle is running, the generator or DC/DC-Converter 9 will charge the battery 2 by applying a forward current through the charging line 7. However, to protect the first power line 3 in the event of a transient disturbance, which may be caused by, for example, a short circuit 12 occurring on the second power line 8, a switch 6 is provided on the charging line 7, controllable by a protection controller 11. The protection controller 11 monitors the voltage on the charging line 7 and, in response to the detection of a change in the voltage exceeding a threshold (e.g. an increase above an upper voltage threshold, or a drop below a lower voltage threshold), will output a control signal for opening the switch 6. This thereby allows the critical modules 4 to be disconnected from the secondary power line 8.

There are however a number of problems with these existing architectures. Firstly, in opening the switch 6 to disconnect the first power line 3 from the second power line 8, significant damage can occur to the switch 6 itself. This is in part due to the relatively high amounts of energy that may be delivered by the system. For example, if the current through the charging line 7 is over 200 A, many joules of energy will be applied to the switch, which can lead to damage or compromise its long-term reliability. Secondly, the dissipation of energy may also necessitate the provision of heat sinks and thermal management systems to maintain operation of the switch. This increases the cost and size of the assembly as a whole. Furthermore, once the switch is open, the vehicle needs to be stopped and system tested to check if the fault has disappeared before the switch may be returned to the closed position. However, while the switch is open, the battery 2 is not able to be recharged, leading it to drain until the vehicle is stopped. Consequently, a brief transient disturbance can result in the battery 2 not being recharged, which ultimately could lead to the power to critical safety components 4 being cut.

Accordingly, there remains a need for an improved vehicle power distribution architecture to address the above shortcomings.

SUMMARY

According to a first aspect, there is provided a vehicle power distribution circuit for connecting between an energy store and a power line connected to a generator or DC/DC-Converter, the circuit including a charging line connecting between the energy store and the power line for charging the energy store when a forward voltage is applied by the generator or DC/DC-Converter; a protection switch provided in the charging line and being openable for preventing conduction of current through the protection switch in response to a drop in voltage on the power line; and an ideal diode arrangement provided in parallel to the protection switch in the charging line for conducting the forward current from the generator or DC/DC-Converter to the energy store when a forward voltage is applied and for preventing the conducting of a reverse current from the energy store to the power line when a reverse voltage is applied.

In this way, the ideal diode arrangement provides a bypass to the protection switch, thereby allowing the energy store, such as a battery or supercapacitor, to be recharged by the generator or DC/DC-Converter even when the protection switch is open. As a consequence, power to the critical components can be maintained for longer, even if a short circuit on the power line causes the protection switch to open. Furthermore, it is also possible to re-close the protection switch after it has been triggered to open once the voltage drop disturbance disappears. That is, the vehicle power distribution circuit does not require the vehicle to be parked in order to reset the protection system because the power line and the energy store are virtually connected over the ideal diode and hence, even if the energy store is weak, the generator or DC/DC converter is able to support a safety critical load. Equally, disturbance on the power line is also reduced because, when the switch is opened, energy to the energy store may continue to be delivered, provided the power line voltage is higher than the energy store voltage.

In embodiments, the vehicle power distribution circuit further includes a controller for controlling the protection switch to open in response to a drop in voltage on the power line. In this way, the controller monitors the voltage on the power line and, in response to the detection of a voltage drop, may output a control signal for opening the protection switch. In embodiments, the controller may be wired into the vehicle power distribution circuit or may communicate with the circuit wirelessly.

In embodiments, the vehicle power distribution circuit further includes a battery line connected to the energy store, and wherein the charging line is connected between the battery line and the power line.

In embodiments, the controller is further for controlling the protection switch to open in response to a drop in voltage on the battery line. In this way, the controller monitors the voltage on the battery line and, in response to the detection of a voltage drop, may output a control signal for opening the switch.

In embodiments, the vehicle power distribution circuit further includes at least one voltage sensor for sensing the voltage on the power line and/or the battery line, and wherein the controller is connected to the at least one voltage sensor for receiving a sensed voltage therefrom.

In embodiments, the protection switch is openable in response to a drop in voltage on the power line below a predefined threshold.

In embodiments, the ideal diode arrangement includes a MOSFET connected in the charging line and an ideal diode controller for driving the MOSFET for emulating an ideal diode.

In embodiments, the MOSFET includes a body, and a gate, and wherein the gate is driven by the ideal diode controller and the body prevents the reverse current when the MOSFET is turned off by the gate.

In embodiments, the controller includes a comparator for comparing the voltage across the MOSFET, wherein the controller drives the gate to turn off the MOSFET when the comparator detects a reverse voltage across the MOSFET. In this way, a reverse voltage can be detected rapidly, using a robust comparator arrangement.

According to a second aspect, there is provided a vehicle power system, including an energy store; a generator or DC/DC-Converter; a power line for connecting the generator or DC/DC-Converter to one or more powered modules; and a distribution circuit, the distribution circuit including a charging line connecting between the energy store and the power line for charging the energy store when a forward voltage is applied by the generator or DC/DC-Converter; a protection switch provided in the charging line and being openable for preventing the conduction of current through the protection switch in response to drop in voltage on the power line; and an ideal diode arrangement provided in parallel to the protection switch in the charging line for conducting the forward current from the generator or DC/DC-Converter to the energy store when a forward voltage is applied and for preventing the conducting of a reverse current from the energy store to the power line when a reverse voltage is applied.

In embodiments, the vehicle power system further includes a battery line for connecting the energy store to one or more critical powered modules, and a first voltage sensor for sensing the voltage on the power line. In this way, an accurate measure of the voltage on the power line can be sensed to more quickly determine if a transient disturbance has occurred.

In embodiments, the vehicle power system further includes a second voltage sensor for sensing the voltage on the battery line. In this way, an accurate measure of the voltage on the battery line can be sensed.

In embodiments, the vehicle power system further includes a controller for controlling the protection switch to open in response to a drop in voltage below a predefined threshold being sensed by the first or the second voltage sensors. In this way, the controller monitors the voltage on the power line and the battery line and, in response to the detection of a drop in the voltage below a predefined threshold, will output a control signal to open the switch. In embodiments, the controller may be wired into the vehicle power distribution circuit or may communicate with the circuit wirelessly.

In embodiments, the ideal diode arrangement includes a MOSFET connected in the charging line, and an ideal diode controller for driving the MOSFET for emulating an ideal diode.

In embodiments, the MOSFET includes a body, and a gate, and wherein the gate is driven by the ideal diode controller and the body prevents the reverse current when the MOSFET is turned off by the gate.

BRIEF DESCRIPTION OF DRAWINGS

Illustrative embodiments will now be described with reference to the accompanying drawings in which.

DETAILED DESCRIPTION

Figure 1:
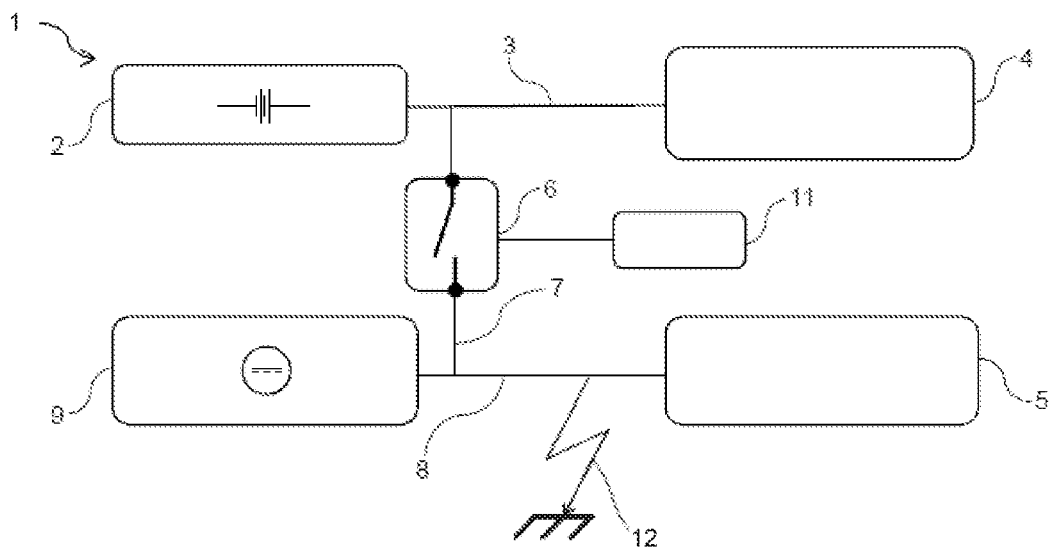
FIG. 1 shows a schematic illustration of a conventional vehicle power distribution architecture.
Figure 2:
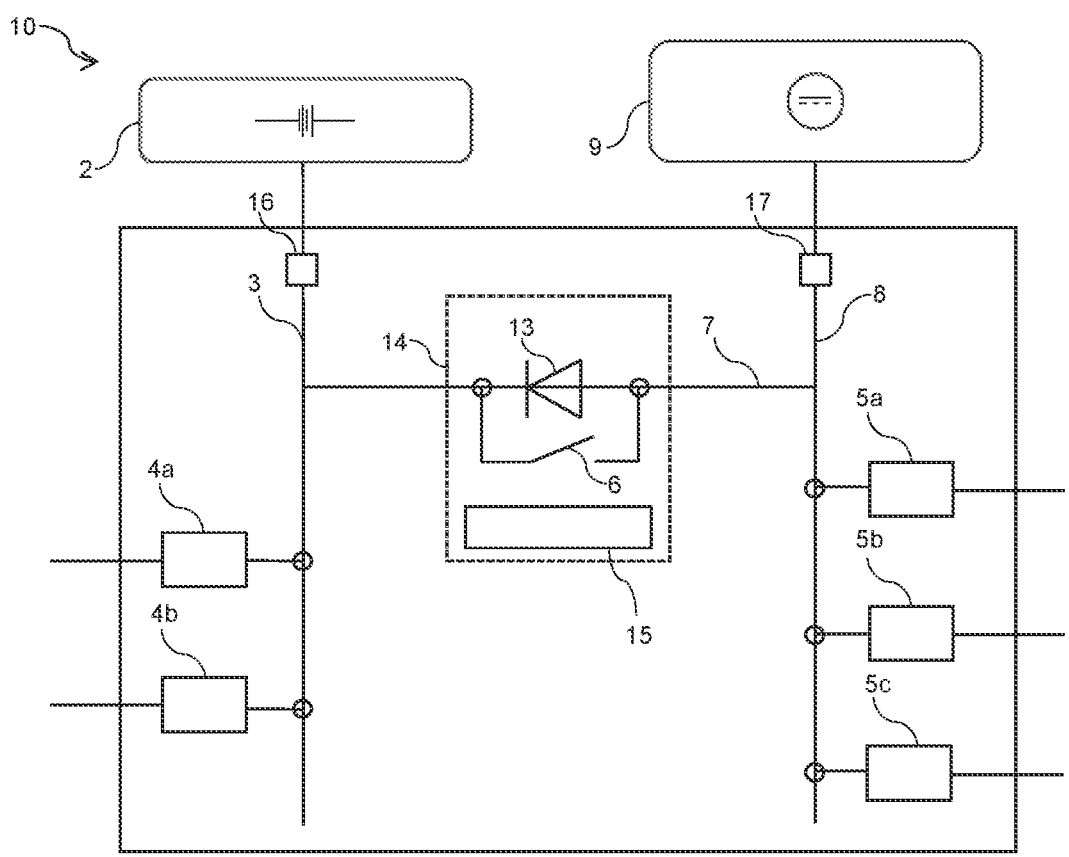
FIG. 2 shows a schematic illustration of a vehicle power distribution architecture according to an illustrative embodiment.

FIG. 2 shows a vehicle power distribution architecture 10 according to an illustrative embodiment. As with the conventional arrangement shown in FIG. 1, the battery 2 functions as an energy store and provides the main power source for supplying energy to one or more critical modules 4a-b via a battery power line 3. Simultaneously, the non-critical modules 5a-c are supplied via a DC/DC power line 8 connected to the vehicle's generator or DC/DC converter 9 for supplying these modules when the vehicle is running. Furthermore, a charging line 7 is provided between the battery power line 3 and the DC/DC power line 8.

The charging line 7 forms part of a power distribution circuit 14 connecting between the vehicle's battery power line 3 and the DC/DC power line 8.

The power distribution circuit 14 further includes a protection switch 6 provided on the charging line 7 and being operable when open for disconnecting the current path through the switch 6 between the battery power line 3 and the DC/DC power line 8. Operation of the protection switch 6 is controlled by controller 15, as is discussed in further detail below.

A DC/DC voltage sensor 17 is provided on the DC/DC power line 8 to sense the voltage thereon, and a battery voltage sensor 16 is provided on the battery power line 3 for sensing voltage thereon. The controller 15 receives measured voltage signals from the voltage sensors 16,17 and controls the opening and closing of the protection switch 6 based on the measured voltages.

An ideal diode arrangement 13 is further provided in the charging line 7, in parallel with the protection switch 6. The ideal diode 13 is arranged to conduct a forward current from the generator or DC/DC-Converter 9 for charging the battery 2. Conversely, the ideal diode arrangement 13 prevents the conducting of a reverse current from the battery 2 to the power line 8 when a reverse voltage is applied. The ideal diode arrangement 13 effectively forms a directional bypass to the protection switch 6 on the charging line 7, and vice versa. Consequently, when the protection switch 6 is open, a forward current from the generator or DC/DC-Converter 9 can bypass the open switch 6 to charge the battery 2. Conversely, when the protection switch 6 is closed, current can bypass the ideal diode arrangement 13 in both directions. As such, in particular, with the switch 6 closed, a reverse current from the battery 2 to the DC/DC power line 8 can bypass the directionality of the ideal diode arrangement 13. This provides for power stabilization on both the battery and DC/DC power lines 3,8.

As is known in the art, an ideal or perfect diode is not a diode in the conventional sense, but is an arrangement of a MOSFET and an ideal diode controller which emulates the behaviour of an ideal diode. Consequently, the arrangement provides very low forward voltage drop and negligible reverse current when a reverse voltage is applied. Within the arrangement, the source and gate of the MOSFET are connected in the charging line 7 such that the MOSFET body blocks the reverse current when the MOSFET is turned off. Conversely, when the MOSFET is on, the forward voltage drop and power dissipation is minimal. The switching of the MOSFET is controlled by the driving of the MOSFET's gate by the ideal diode controller, which senses a reverse current through the MOSFET, and drives the gate to turn it off, thereby blocking the reverse current.

In this embodiment, the MOSFET is an N-channel MOSFET, although other MOSFET configurations are possible. The ideal diode controller has an internal charge pump for driving the MOSFET gate higher than its anode, a forward comparator for turning on the MOSFET, and a reverse current comparator for turning off the MOSFET when a reverse current is detected. The reverse comparator monitors the voltage across the controller's anode and cathode and, if a reverse current is detected, the MOSFET's gate is shorted with a strong pulldown current. This rapidly provides a strong gate drive to pull down the gate to the source voltage, thereby turning off the MOSFET rapidly. As such, the ideal diode arrangement 13 may provide a rapid response to prevent the conduction of a reverse current through the MOSFET and hence the charging line 7. Furthermore, advantageously, by using a comparator, the shutdown current threshold may be set extremely low, thereby allowing the emulation of an ideal diode response.

In use, during normal vehicle operating conditions, the vehicle power distribution circuit 14 allows the generator or DC/DC Converter 9 to power both the non-critical loads 5a-c via power line 8 and, over charging line 7, the critical loads 4a-b via battery line 3. Where the voltage is higher on the DC/DC line 8, the surplus energy from the generator or DC/DC-Converter 9 further charges the battery 2 via a forward current path conducted through the closed protection switch 6 and/or the MOSFET within the ideal diode arrangement 13.

In use, a drop in voltage on either the battery or DC/DC power line 8 will be detected by the controller 15 via the voltage sensors 16,17. The controller 15 is configured to detect a voltage drop below a predetermined minimum threshold and open the protection switch 6 in response thereto. For instance, in a 12V automotive E/E architecture, a voltage drop below the 12V minimum threshold on either power line 3,8 may cause the controller 15 to trigger the protection switch 6 to open. It will be understood that, in embodiments, the minimum threshold may be adjusted depending on the operating voltage of the E/E architecture and the required sensitivity of the protection circuit. Equally, the controller 15 may include filters for filtering out very brief transient voltage fluctuations. In embodiments, the controller may also be configured to open the protection switch 6 in the event that the detected voltage on either power line 3,8 exceeds a predetermined upper threshold.

With the above arrangement, if a short circuit event were to arise on either the DC/DC power line 8, or within the generator or DC/DC-Converter 9, a transient drop in voltage may occur on the power line 8. As discussed above, this voltage drop will be detected by the controller through the DC/DC voltage sensor 17 and provided the drop is below the predefined minimum threshold, the controller 15 will output a signal to open protection switch 6. By opening the switch 6, a relatively high reverse current is prevented from being drawn from the battery 2. Isolating the power drain in this manner protects the battery 2 from any low voltage transient disturbances occurring at the generator or DC/DC-Converter 9, which in turn prevents the voltage on the battery line 3 dropping, thereby ensuring that the operation of the critical modules 4a-b remains unaffected. As such, the protection switch 6 functions as a low battery transient protection switch 6 for preventing the draining of the battery 2 through a short to the DC/DC power line 8.

Importantly, the ideal diode arrangement 13 provided on the charging line 7 allows the generator or DC/DC-Converter 9 to continue to charge the battery 2 via charging line 7 while the protection switch 6 is open. Consequently, if a momentary short circuit event causes the triggering of a protection switch response, but the voltage on the DC/DC power line 8 is quickly restored, energy may continue to be delivered to charge the battery 2 through the ideal diode arrangement 13 provided the voltage on the DC/DC power line 8 is higher than the voltage on the battery line 3. As such, charging of the battery 2 can be maintained even after a short circuit event has occurred. Furthermore, disturbances on the power line 8 are also reduced because higher generated voltages may be stabilised by the forward current path through the ideal diode arrangement 13.

It will also be appreciated that, with the above arrangement, if the battery 2 is weak, the associated voltage on the battery power line 3 will also drop. As such, if this voltage drops below the predetermined minimum threshold, the controller 15 will respond by opening the protection switch 6, thereby preventing a reverse current flow though the switch 6, whilst permitting a forward current flow through the ideal diode arrangement 13.

The controller 15 will sense, via the voltage sensors 16,17, when the voltages on the battery and DC/DC power lines 3,8 have returned to a level above the predetermined minimum threshold and, in response, is configured to close the protection switch 6. This thereby restores the bi-directional current path through the switch 6, and hence allows bypassing of the ideal diode arrangement 13. In this way, further transient voltage disturbances may be stabilised across the two power lines without needing to reset by stopping the vehicle.

Accordingly, with the above described arrangement, a vehicle power distribution circuit and vehicle power system may be provided which allow for efficient and effective short circuit protection, whilst allowing power to any critical modules to be maintained for as long as possible. As such, the vehicle can remain in safe operation for a longer time than when utilising conventional power architectures.

It will be understood that the embodiment described above shows an application only for the purposes of illustration. In practice, embodiments may be applied to many different configurations, the detailed embodiments being straightforward for those skilled in the art to implement.

For example, although the arrangement allows for short circuit protection without the need for complex microprocessors, it will be understood that other implementations may be used in conjunction with one or more microprocessors, for instance to provide performance feedback and fault monitoring.

Moreover, although a vehicle power distribution circuit has been described, it will be understood that this circuit may be incorporated into a distribution box, or form part of a power distribution system incorporated into a vehicle.

The invention claimed is:

1. A vehicle power distribution circuit for connecting between an energy storage device and a power line connected to a generator or a DC/DC-Converter, the vehicle power distribution circuit comprising:
   a charging line connected between the energy storage device and the power line for charging the energy storage device when a forward voltage is applied by the generator or the DC/DC-Converter;
   a protection switch provided in the charging line and being openable for preventing conduction of current through the protection switch in response to a drop in voltage on the power line, wherein the protection switch is opened in response to a drop in voltage on the power line below a predefined threshold indicative of a short circuit on the power line;
   an ideal diode arrangement provided in parallel to the protection switch in the charging line for conducting a forward current from the generator or the DC/DC-Converter to the energy storage device when forward voltage is applied and for preventing a reverse current from the energy storage device to the power line when a reverse voltage is applied;
   a battery line connected to the energy storage device, wherein the charging line is connected between the battery line and the power line; and
   a plurality of critical modules connected to the battery line, wherein:
      the plurality of critical modules are supplied, via the battery line, electrical current from the energy storage device when the protection switch is in an open configuration, and
      the plurality of critical modules are supplied, via the charging line, electrical current from the generator or the DC/DC-Converter when the protection switch is in a closed configuration.

2. The vehicle power distribution circuit of claim 1, further comprising a controller for controlling the protection switch to open in response to a drop in voltage on the power line.

3. The vehicle power distribution circuit of claim 2, wherein the controller is further for controlling the protection switch to open in response to a drop in voltage on the battery line.

4. The vehicle power distribution circuit of claim 2, further comprising at least one voltage sensor for sensing the voltage on the power line and/or the battery line, and wherein the controller is connected to the at least one voltage sensor for receiving a sensed voltage therefrom.

5. The vehicle power distribution circuit of claim 2, wherein the ideal diode arrangement includes:
   a MOSFET connected in the charging line; and
   an ideal diode controller for driving the MOSFET for emulating an ideal diode.

6. The vehicle power distribution circuit of claim 5, wherein;
   the MOSFET includes a body and a gate;
   the gate is driven by the ideal diode controller; and
   the body prevents the reverse current when the MOSFET is turned off by the gate.

7. The vehicle power distribution circuit of claim 6, wherein:
   the ideal diode controller includes a comparator for comparing the voltage across the MOSFET; and
   the controller drives the gate to turn off the MOSFET when the comparator detects a reverse voltage across the MOSFET.

8. The vehicle power distribution circuit of claim 2, wherein the controller is configured to filter transient voltage fluctuations.

9. The vehicle power distribution circuit of claim 1, wherein the ideal diode arrangement is located on a central point along the charging line.

10. The vehicle power distribution circuit of claim 1, wherein the charging line is directly connected to the battery line and the power line.

11. The vehicle power distribution circuit of claim 1, wherein the protection switch is further opened in response to a drop in voltage on the battery line below a second predefined threshold.

12. The vehicle power distribution circuit of claim 1, wherein:
   the plurality of critical modules are associated with modules that are paramount to safe operation of a vehicle; and
   each module of the plurality of critical modules is associated with at least one of: a steering system of the vehicle, an advanced driver-assistance system of the vehicle, or a braking system of the vehicle.

13. The vehicle power distribution circuit of claim 1, further comprising a plurality of non-critical modules connected to the power line and configured to receive electrical current from the generator or the DC/DC-Converter.

14. A vehicle power system, comprising:
   an energy storage device;
   a generator or a DC/DC-Converter;
   a power line for connecting the generator or the DC/DC-Converter to one or more powered modules;
   a distribution circuit including:

a charging line connected between the energy storage device and the power line for charging the energy storage device when a forward voltage is applied by the generator or the DC/DC-Converter, a protection switch provided in the charging line and being openable for preventing conduction of current through the protection switch in response to drop in voltage on the power line, wherein the protection switch is opened in response to a drop in voltage on the power line below a predefined threshold indicative of a short circuit on the power line;

an ideal diode arrangement provided in parallel to the protection switch in the charging line for conducting a forward current from the generator or the DC/DC-Converter to the energy storage device when forward voltage is applied and for preventing a reverse current from the energy storage device to the power line when a reverse voltage is applied;

a battery line connected to the energy storage device, wherein the charging line is connected between the battery line and the power line; and a plurality of critical modules connected to the battery line, wherein:

the plurality of critical modules are supplied, via the battery line, electrical current from the energy storage device when the protection switch is in an open configuration, and the plurality of critical modules are supplied, via the charging line, electrical current from the generator or the DC/DC-Converter when the protection switch is in a closed configuration.

15. The vehicle power system of claim 14, further comprising a second voltage sensor for sensing the voltage on the battery line.

16. The vehicle power system of claim 14, wherein the ideal diode arrangement includes:

a MOSFET connected in the charging line; and an ideal diode controller for driving the MOSFET for emulating an ideal diode.

17. The vehicle power system of claim 16, wherein:

the MOSFET includes a body and a gate;

the gate is driven by the ideal diode controller; and the body prevents the reverse current when the MOSFET is turned off by the gate.

18. A vehicle power distribution circuit for connecting between an energy storage device and a power line connected to a generator or a DC/DC-Converter, the vehicle power distribution circuit comprising:

a charging line connected between the energy storage device and the power line for charging the energy storage device when a forward voltage is applied by the generator or the DC/DC-Converter;

a battery line directly connected to the energy storage device and the charging line, wherein the charging line is directly connected to the battery line and the power line;

a protection switch provided in the charging line and being openable for preventing conduction of current through the protection switch in response to a drop in voltage on the power line, wherein the protection switch is opened in response to a drop in voltage on the power line below a predefined threshold indicative of a short circuit on the power line;

an ideal diode arrangement provided in parallel to the protection switch in the charging line for conducting a forward current from the generator or the DC/DC-Converter to the energy storage device when forward voltage is applied and for preventing a reverse current from the energy storage device to the power line when a reverse voltage is applied; and a plurality of critical modules connected to the battery line, wherein:

the plurality of critical modules are supplied, via the battery line, electrical current from the energy storage device when the protection switch is in an open configuration, and the plurality of critical modules are supplied, via the charging line, electrical current from the generator or the DC/DC-Converter when the protection switch is in a closed configuration.

* * * * *